United States Patent
Kaufhold

(10) Patent No.: US 9,671,570 B2
(45) Date of Patent: Jun. 6, 2017

(54) WAVELENGTH DIVISION MULTIPLEXOR MODULE

(71) Applicant: UNITED TECHNOLOGISTS EUROPE LIMITED, Hadleigh, Suffolk (GB)

(72) Inventor: Gerwin Frank Kaufhold, Hadleigh (GB)

(73) Assignee: United Technologists Europe Limited (GB)

( * ) Notice: Subject to any disclaimer, the term of this patent is extended or adjusted under 35 U.S.C. 154(b) by 0 days.

(21) Appl. No.: 14/911,420

(22) PCT Filed: Aug. 13, 2014

(86) PCT No.: PCT/GB2014/052478
§ 371 (c)(1),
(2) Date: Feb. 10, 2016

(87) PCT Pub. No.: WO2015/022531
PCT Pub. Date: Feb. 19, 2015

(65) Prior Publication Data
US 2016/0195683 A1  Jul. 7, 2016

(30) Foreign Application Priority Data

Aug. 14, 2013 (GB) .................................. 1314569.3

(51) Int. Cl.
*G02B 6/00* (2006.01)
*G02B 6/38* (2006.01)
(Continued)

(52) U.S. Cl.
CPC ....... *G02B 6/3897* (2013.01); *G01M 11/3154* (2013.01); *G02B 6/2938* (2013.01);
(Continued)

(58) Field of Classification Search
CPC .................................................. G01M 11/3154
See application file for complete search history.

(56) References Cited

U.S. PATENT DOCUMENTS 5,461,693 A    10/1995  Pimpinella
5,793,909 A *  8/1998   Leone .................. H04B 10/071
                                                     385/134
(Continued)

FOREIGN PATENT DOCUMENTS

EP          0828356 A2     3/1998

*Primary Examiner* — Sung Pak
(74) *Attorney, Agent, or Firm* — McGarry Bair PC

(57) ABSTRACT

An optical wavelength division multiplexor module (40) has a housing (44) having a front face (45) and a rear face (46). The wavelength division multiplexor module (40) comprises a short wavelength path terminal (41), a common optical terminal (42), and a long wavelength path terminal (43). The short wavelength path terminal (41) comprises a first fiber optic adapter (48), for engaging a fiber optic connector of a first patch cable (24), while the common optical terminal (42) comprises a second fiber optic adapter (48), for engaging a fiber optic connector of a second patch cable (26). The long wavelength path terminal (43) comprises a fiber optic connector (49) for directly engaging with a fiber optic adapter (48) carried on a modified optical test access switch (50). The short wavelength path terminal (41) and the common optical terminal (42) are both provided on the front face (45) of the housing (44), while the long wavelength path terminal (43) is provided on the rear face (46) of the housing (44).

4 Claims, 4 Drawing Sheets

(51) Int. Cl.
*H04B 10/071* (2013.01)
*G02B 6/293* (2006.01)
*G02B 6/35* (2006.01)
*G01M 11/00* (2006.01)
*H04B 10/25* (2013.01)
*H04J 14/02* (2006.01)
*H04Q 11/00* (2006.01)

(52) U.S. Cl.
CPC ......... *G02B 6/3548* (2013.01); *G02B 6/3825* (2013.01); *H04B 10/071* (2013.01); *H04B 10/25* (2013.01); *H04J 14/02* (2013.01); *H04Q 2011/0016* (2013.01)

(56) References Cited

U.S. PATENT DOCUMENTS

| | | | | |
|---|---|---|---|---|
| 6,055,343 A | * | 4/2000 | Pimpinella | G02B 6/3502 385/134 |
| 6,317,535 B1 | * | 11/2001 | Jennings | G01M 11/3136 385/24 |
| 6,366,724 B1 | * | 4/2002 | Jennings | H04B 10/00 372/29.01 |

* cited by examiner

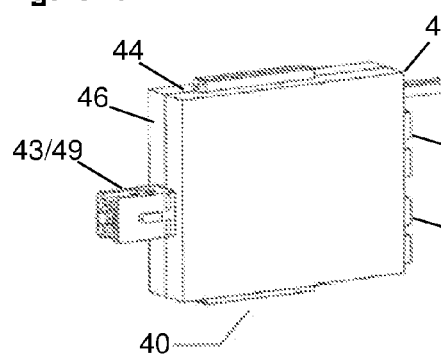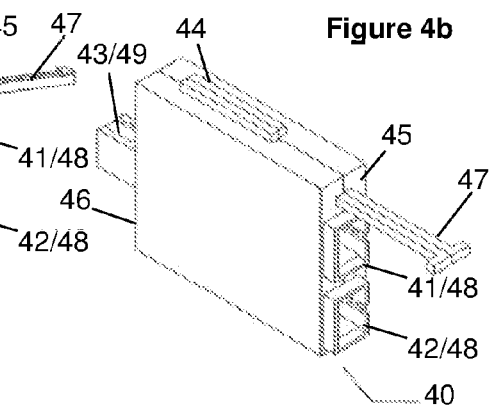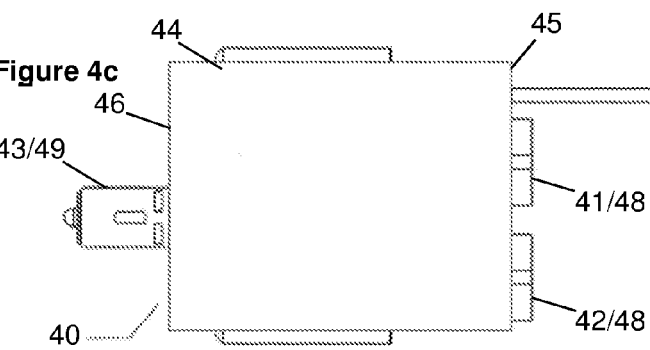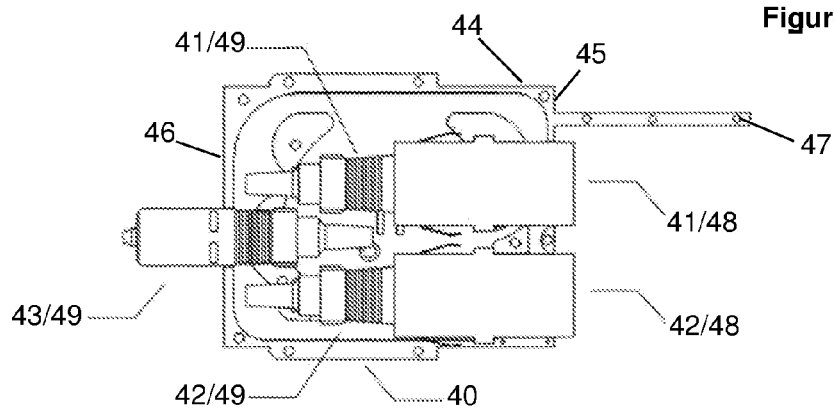

WAVELENGTH DIVISION MULTIPLEXOR MODULE

This application is a National Phase application of International Application No. PCT/GB2014/052478, filed Aug. 13, 2014, which claims the benefit of British Patent Application No. 1314569.3, filed Aug. 14, 2013, both of which are incorporated herein by reference in their entireties.

This invention relates, in a first aspect thereof, to an optical wavelength division multiplexor (WDM) module for use in a fibre optic communication network. In particular, it relates to such a WDM module which can be plugged directly into an optical test access switch. The invention also relates, in further aspects thereof, to: a modified optical test access switch adapted to receive such an optical wavelength division multiplexor module; and an optical test system comprising such an optical wavelength division multiplexor module and such a modified optical test access switch.

Physical points of damage in fibre optic communication networks can be accurately located from within the network's central office using an optical time domain reflectometer (OTDR). This device fires pulses of light into the optical fibres and identifies and locates unexpected discontinuities by monitoring and measuring the resultant optical reflections within the fibre network. The OTDR uses a longer wavelength of light (1650 nm, as specified by the International Telecommunication Union, ITU) than that used by the data transmission equipment, with shorter wavelengths being used for data transmission, so that OTDRs can be used in operational networks without disrupting service.

In order to connect an OTDR test system, passive wavelength division multiplexors (WDMs) need to be fitted into each optical fibre path to provide an optical connection point for the OTDR test system.

A wavelength division multiplexor is a passive three terminal device, having a long wavelength path terminal, a short wavelength path terminal, and a common optical terminal. The WDM thus provides separate short and long wavelength bi-directional optical paths to the common optical terminal. The short wavelength path terminal is connected to the central office optical transmission equipment while the common terminal is connected to the outgoing optical fibre. An optical test access switch is used to connect the OTDR to the long wavelength path terminal.

A conventional installation of an OTDR test system into an existing optical data communications central office can be a complex and costly task, as three optical patch cables must be run to connect each WDM: a first cable to connect the short wavelength path terminal of the WDM to one side of a main optical distribution frame, for connection to the central office optical transmission equipment; a second to connect the common optical terminal of the WDM to the other side of the main optical distribution frame, for connection to the outgoing optical fibre; and a third to connect the long wavelength path terminal of the WDM to the optical test access switch.

The use of multiple lengths of patch cable is undesirable both due to the cost of the cable itself, and the space required to accommodate the 'slack' of the cable. The accommodation and management of cable slack is an important consideration, since it is necessary to ensure that the cables are arranged so that any bends therein have a large radius of curvature. This is because any tight bends formed in the cables could result in major transmission losses once the critical bend radius is exceeded. Potential damage to the optical fibres is a secondary issue which can also arise from exceeding the critical bend radius.

In addition, the greater the number of patch cables used in an optical path, the greater the number of optical connections—via optical connectors and adapters—there will be. Each such optical connection presents the potential for optical loss, with the result that power levels in the network drop and the transmission can be effected. Minimising the number of optical connections, by minimising the number of patch cables, in any given optical path, is therefore desirable.

Network operators generally use standard length patch cables and rely on cable management facilities on the main optical distribution frame to accommodate the excess slack from the additional patch cables. However, these cable management facilities on the main optical distribution frame are only dimensioned for a single patch cable per optical circuit—i.e. the principal patch cable connecting the central office side of the distribution frame to the subscriber line side of the frame. There is thus insufficient space safely to accommodate the two additional required cables without risking damage to the cables.

The present invention seeks to address the above issues by providing a wavelength division multiplexor module which can be plugged directly into an optical test access switch. This will enable the installation process for an OTDR test system to be simplified, and will reduce cost, space requirements and complexity. In addition, the optimised OTDR installation of the prior art requires one less optical patch cable—and hence one less optical connection—than conventional installations, thus reducing the potential for optical loss in the test path.

According to a first aspect of the present invention there is provided an optical wavelength division multiplexor module comprising:
   a short wavelength path terminal comprising a first fibre optic adapter, for engaging a fibre optic connector of a first patch cable;
   a common optical terminal comprising a second fibre optic adapter, for engaging a fibre optic connector of a second patch cable; and
   a long wavelength path terminal comprising a fibre optic connector for directly engaging with a fibre optic adapter carried on an optical test access switch.

The fibre optic adapters of the common and short wavelength terminals of the WDM are preferably standard optical adapters.

The first patch cable will generally be connected, via a first side of a main optical distribution frame, to an equipment line fibre optic cable, whilst the second patch cable will generally be connected, via a second side of the main optical distribution frame, to a subscriber line fibre optic cable.

The fibre optic connector of the long wavelength path terminal preferably enables mounting of the module on an optical test access switch. Most preferably, the WDM module further comprises a housing having a front and a rear face, with the fibre optic adapters of the short wavelength path terminal and the common terminal being provided on the front face, and the fibre optic connector of the long wavelength path terminal being provided on the rear face.

The optical wavelength division multiplexor module housing preferably further comprises a pull tab provided on the front face thereof, to facilitate removal of the module from an optical test access switch.

The optical wavelength division multiplexor module according to the first aspect of the present invention thus packages the wavelength division multiplexor into a three terminal module which can be plugged directly into the electro-mechanical optical test access switch. The optical test access switch mechanism thus connects directly to the long wavelength terminal of the WDM module, eliminating the need for the third optical patch cable referred to hereinbefore with reference to the conventional OTDR installation of the prior art. This results in one optical connection to be eliminated, as compared to conventional installations, thus reducing the potential for optical loss in the test path. This is a significant benefit as the returned signal level to the OTDR is typically extremely low.

A further advantage of incorporating WDMs into individual modules is that the WDMs can easily be added or changed out one at a time. Using a conventional approach, multiple WDMs (typically six) would share a fibre tray. Adding or changing out WDMs under such circumstances is thus a far more cumbersome and laborious task with the inherent danger of impact on other customer circuits.

According to a second aspect of the present invention there is provided a modified optical test access switch adapted to receive an optical wavelength division multiplexor module as hereinbefore described, said modified optical test access switch having a fibre optic adapter for directly engaging the fibre optic connector of the long wavelength path terminal of said module.

Preferably, the fibre optic adapter of the modified optical test access switch also enables mounting of the module on the optical test access switch. Most preferably, the modified optical test access switch further comprises a housing having a front face, on which the fibre optic adapter of the optical test access switch is provided.

The modified optical test access switch housing preferably further comprises cable management space adapted to receive part of the first patch cable. The housing thus provides a cable slack management facility for the required additional cable.

The use of optical test access switches modified according to the second aspect of the present invention, along with WDM modules according to the first aspect of the present invention will dramatically reduce the complexity, cost and space requirements for installing OTDR based optical fibre monitoring systems. It is envisaged that these benefits will be particularly relevant for retrofit installations.

The adaptation of the optical test access switch front panel to accept WDM modules does not preclude the direct connection of ordinary optical patch cables in their place if required, as the optical connection point will still be a standard optical adapter. The modified optical test access switch can therefore simultaneously support connections to live optical networks carrying traffic using WDM plug-in modules as well as 'dark' fibre not carrying traffic. This physical architecture provides further benefit as monitored dark fibre can be easily brought into service by plugging a WDM module in series with the existing patch cable at the optical test access switch and simply adding a return connection to an optical transmission equipment port.

According to a third aspect of the present invention there is provided a modified optical test system for a fibre optic network, comprising an optical wavelength division multiplexor module as hereinbefore described, and a modified optical test access switch as also hereinbefore described.

The optical wavelength division multiplexor module is preferably mounted directly on the modified optical test access switch.

The modified optical test system preferably further comprises an optical time domain reflectometer arranged to be connected to the fibre optic network via the modified optical test access switch and the wavelength division multiplexor module.

In order that the present invention can be more clearly understood, preferred embodiments thereof will now be described in detail, though only by way of example, with reference to the accompanying drawings, in which:

FIG. 4a shows a perspective rear view of a wavelength division multiplexor (WDM) module according to a first aspect of the present invention;

FIG. 4b shows a perspective front view of the WDM module of FIG. 4a;

FIG. 4c shows a side view of the WDM module of FIGS. 4a and 4b; and

FIG. 4d shows an internal cutaway view of the WDM module of FIGS. 4a to 4c.

Figure 1:
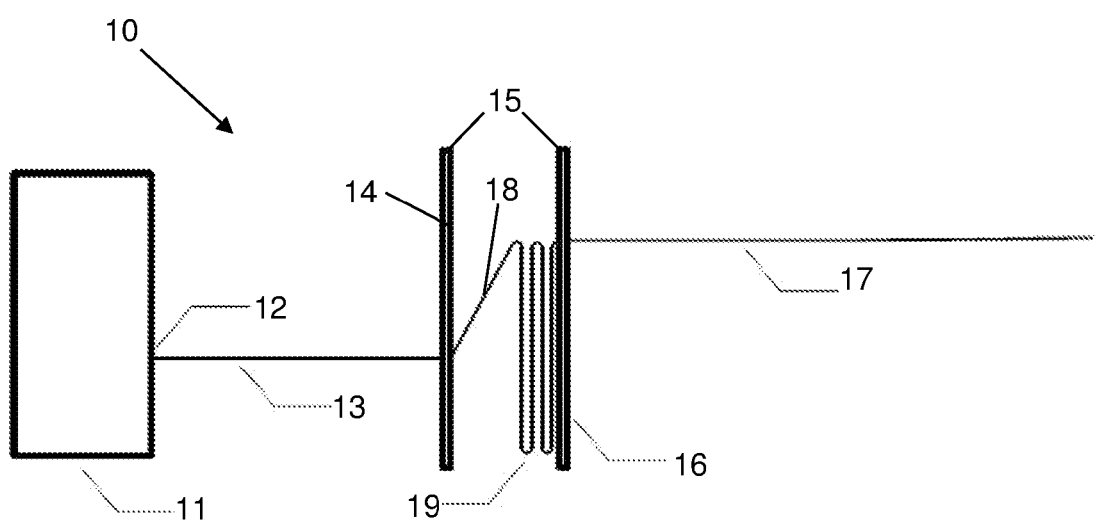
FIG. 1 shows a diagrammatic representation of a typical optical fibre connection path, without an optical time domain reflectometer (OTDR) test system connected.

Referring first to FIG. 1, there is shown a typical optical fibre connection path, generally indicated 10, in a central office of a fibre optic communications network. Central office optical transmission equipment 11 has an optical fibre port 12, via which an equipment line optical fibre cable 13 connects the optical transmission equipment 11 to a first side 14 of a main optical distribution frame 15. The second side 16 of the main optical distribution frame 15 is connected to an outgoing subscriber line optical fibre cable 17 which carries transmissions from the central office equipment 11 to one or more customers. A main patch cable 18 is used to interconnect a specific transmission equipment port 2 to a specific outgoing fibre 17 across the optical distribution frame 15. As can be seen, the main patch cable 18 has excess slack 19, which is accommodated and managed within the main optical distribution frame 15.

Figure 2:
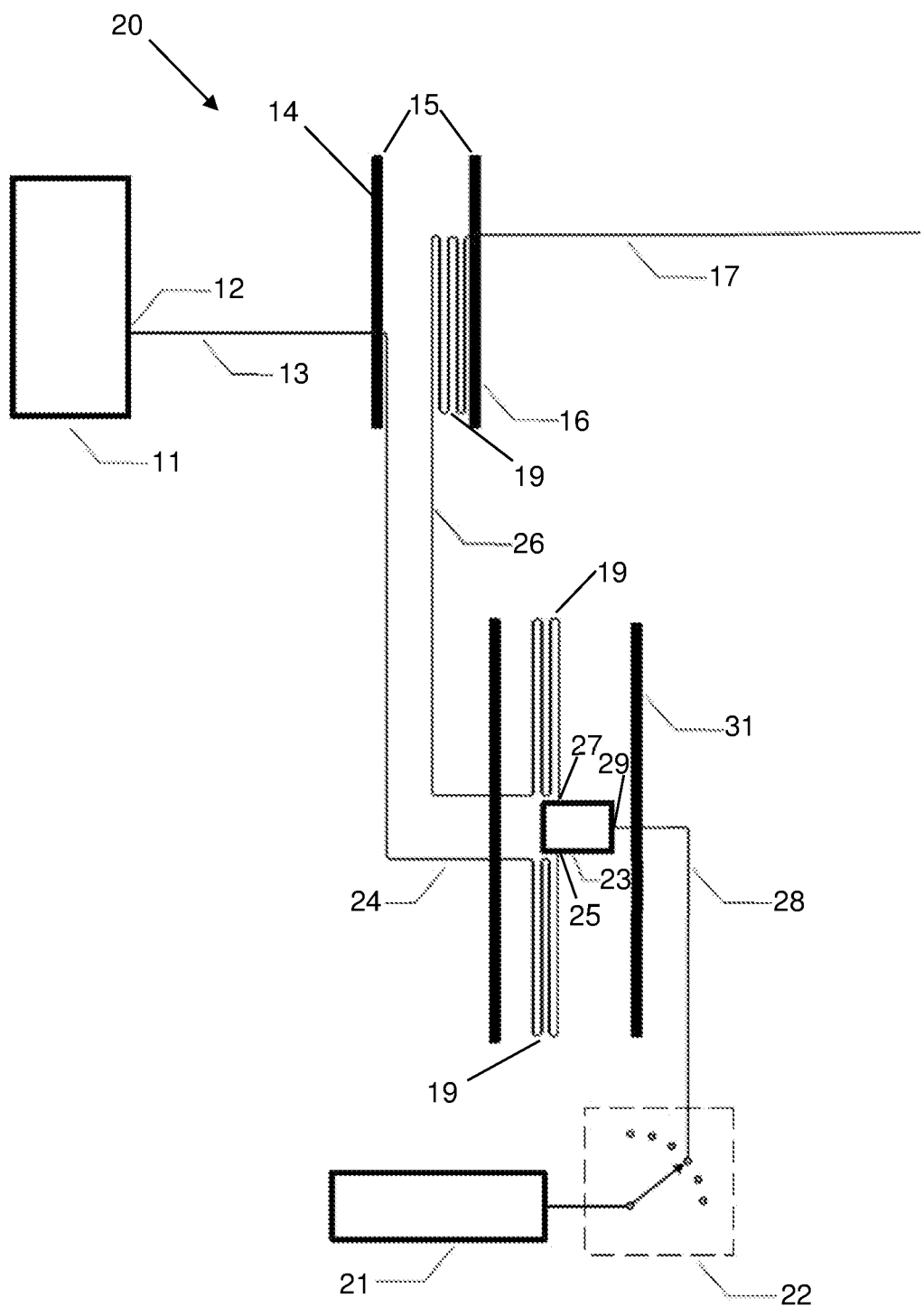
FIG. 2 shows the optical fibre connection path of FIG. 1 modified to enable automated OTDR testing according to a conventional (prior art) installation.

Referring now to FIG. 2, this shows the optical fibre connection path from FIG. 1, now generally indicated 20, modified to incorporate automated optical time domain reflectometer (OTDR) testing equipment 21 according to a conventional (prior art) installation. The OTDR 21 is connected to the optical path 20 via an optical test access switch 22 and a conventional wavelength division multiplexor (WDM) 23. This requires the main patch cable 18 from FIG. 1 to be replaced with three alternate patch cables (thus making a total of two additional cables as compared to the unmodified optical path 10 of FIG. 1) as follows:

a first patch cable 24 connects the short wavelength port 25 of the WDM 23, via the first side 14 of the main optical distribution frame 15, to the equipment line cable 3;

a second patch cable 26 connects the common port 27 of the WDM 23, via the second side 16 of the main optical distribution frame 5, to the subscriber line cable 17; and a third patch cable 28 connects the long wavelength port 29 of the WDM 23 to the optical test access switch 22.

As will be explained in more detail below, it will be noted from FIG. 2 that the first and second patch cables 24, 26 are appreciable longer than the main patch cable 18 which they replace.

It should be borne in mind that the optical path 20 illustrated in FIG. 2 will be only one of a very large number of such paths 20 carried on the main optical distribution frame 15, with each such optical path 20 being fitted with a conventional WDM 23 and its associated patch cables 24, 26, 28. As such, conventional installations of this kind give rise to the problems of how to house the multiple WDMs 23 and how to accommodate and manage the slack 19 in the additional patch cables 24, 26, 28. As can be seen in FIG. 2, this is typically addressed by installing a dedicated secondary optical distribution frame 31 to house the WDMs 23. The physical separation of the main 15 and secondary 31 optical distribution frames thus necessitates the use of the longer patch cables 24, 26.

The first patch cable 24 utilises cable management space in the secondary optical distribution frame 31 in order to accommodate and manage its slack 19. The second patch cable 26 is able to use existing cable management space in the main optical distribution frame 15 to accommodate some of its slack 19, though additional cable management space in the secondary frame 31 is also required.

Figure 3:
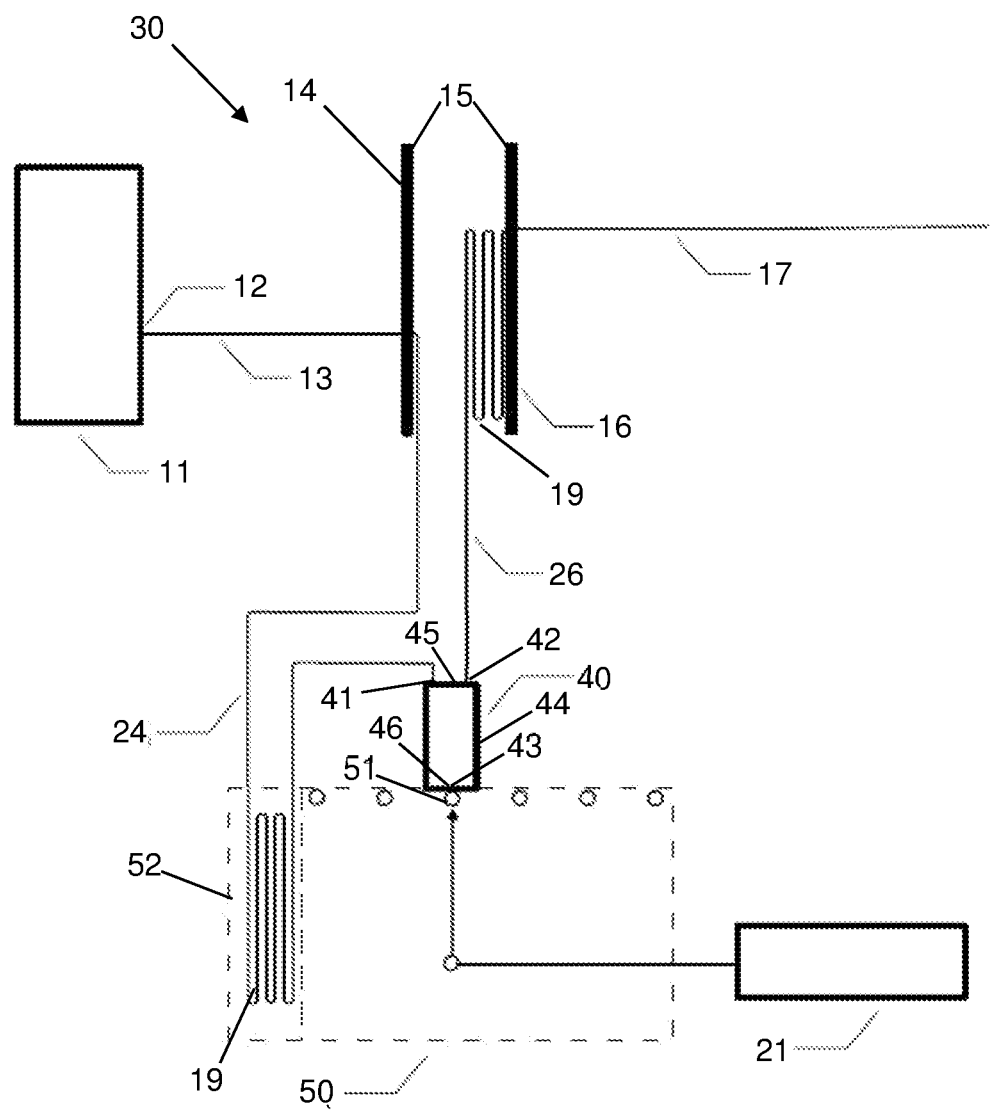
FIG. 3 shows the optical fibre connection path of FIG. 1 modified to enable automated OTDR testing according to the present invention.

Referring now to FIG. 3, this shows an alternative modification of the optical fibre connection path, now generally indicated 30, so as to incorporate OTDR testing equipment 21 by way of an improved installation according to the present invention. The conventional WDM 23 of the prior art installation of FIG. 2 has now been replaced with a wavelength division multiplexor module 40, according to the first aspect of the present invention. As will be described in more detail below with reference to FIG. 4, the WDM module 40 has: a short wavelength path terminal 41, to which the first patch cable 24 connects; a common optical terminal 42, to which the second patch cable 26 connects; and a long wavelength path terminal 43. The long wavelength path terminal 43 connects directly with an optical port 51 on a modified optical test access switch 50, according to the second aspect of the present invention.

The WDM module 40 has a housing 44 having a front face 45 and a rear face 46. The short wavelength path terminal 41 and the common optical terminal 42 are provided on the front face 45 of the housing 44, whilst the long wavelength path terminal 43 is provided on the rear face 46. As will be described in more details below with reference to FIG. 4, the long wavelength path terminal 43 performs the dual functions of providing an optical path connection between the WDM module 40 and the modified optical test access switch 50, and also enabling the physical mounting of the WDM module 40 on the test access switch 50.

The optical test access switch 50 is further modified so as to include cable management space 52 to accommodate and manage slack 19 in the first patch cable 24. The slack 19 in the second patch cable 26 is now accommodated and managed entirely within the main optical distribution frame 15.

As a result of the physical mounting of the module 40 on the test access switch 50, and the management of cable slack 19 within the cable management space 52 of the test access switch 50, the secondary optical distribution frame 31 from the prior art installation shown in FIG. 3 is no longer required. This leads to considerable savings in space, and therefore cost. The third patch cable 28 from the prior art installation of FIG. 3 is also no longer required, since the WDM module 40 now connects directly to the test access switch 50. This leads to further space and cost savings, and also minimises the potential for optical loss by reducing the number of connections in the optical test path by one.

Installation of the OTDR monitoring equipment 21 now becomes a simple matter of removing the main patch cable 18 shown in FIG. 1, and connecting the first and second alternate patch cables 24, 26 in its place.

Referring now simultaneously to FIGS. 4a to 4d, there is shown a preferred embodiment of wavelength division multiplexor module 40, according to the present invention. As described above with reference to FIG. 3, the WDM module 40 has a housing 44 having a front face 45 and a rear face 46. The short wavelength path terminal 41 and the common optical terminal 42 are provided on the front face 45 of the housing 44, whilst the long wavelength path terminal 43 is provided on the rear face 46. As can also be seen from FIGS. 4a to 4d, the short wavelength path terminal 41 and the common optical terminal 42 each take the form of standard fibre optic adapters 48, whilst the long wavelength path terminal 43 takes the form of a standard fibre optic connector 49. As can be seen from FIG. 4d, the short wavelength path terminal 41 and the common optical terminal 42 each also comprise a standard fibre optic connector 49 mounted within the module housing 44 and connected to one side of the adapter 48 for the respective terminal 41, 42.

The standard fibre optic connector 49 which constitutes the long wavelength path terminal 43, provided on the rear face 46 of the WDM module 40 is arranged to plug directly into a standard fibre optic adapter 48 which constitute the optical port 51 on the front face of the modified optical test access switch 50, as described above with reference to FIG. 3. The WDM module 40 is further provided on the front face 45 thereof with a pull tab 47 to aid removal of the module 40 from a test access switch 50 when required.

The invention claimed is:

1. A modified optical test access switch adapted to receive an optical wavelength division multiplexor module, said optical wavelength division multiplexor module having a short wavelength path terminal comprising a first fibre optic adapter, for engaging a fibre optic connector of a first patch cable;

a common optical terminal comprising a second fibre optic adapter, for engaging a fibre optic connector of a second patch cable;

a long wavelength path terminal comprising a fibre optic connector for directly engaging with a fibre optic adapter carried on the optical test access switch, wherein said fibre optic connector enables direct mounting of said optical wavelength division multiplexor module on said optical test access switch; and a housing having a front face and a rear face, the first and second fibre optic adapters of the short wavelength path terminal and the common optical terminal, respectively, being provided on said front face, and the fibre optic connector of the long wavelength path terminal being provided on said rear face;

wherein said modified optical test access switch has a fibre optic adapter for directly engaging the fibre optic connector of the long wavelength path terminal of said optical wavelength division multiplexor module, said fibre optic adapter further enabling direct mounting of said optical wavelength division multiplexor module on said optical test access switch and wherein said optical test access switch further comprises a housing having a front face, the fibre optic adapter of the optical test access switch being provided on said front face.

2. A modified optical test access switch as claimed in claim 1, wherein said housing of said optical test access switch further comprises cable management space adapted to receive part of said first patch cable.

3. A modified optical test system for a fibre optic network, comprising:

an optical wavelength division multiplexor module having a short wavelength path terminal comprising a first fibre optic adapter, for engaging a fibre optic connector of a first patch cable; a common optical terminal comprising a second fibre optic adapter, for engaging a fibre optic connector of a second patch cable; and a long wavelength path terminal comprising a fibre optic connector for directly engaging with a fibre optic adapter carried on an optical test access switch; and a modified optical test access switch having a fibre optic adapter for directly engaging the fibre optic connector of the long wavelength path terminal of said optical wavelength division multiplexor module;

wherein the optical wavelength division multiplexor module is mounted directly on the modified optical test access switch.

4. A modified optical test system as claimed in claim 3, further comprising an optical time domain reflectometer arranged to be connected to said fibre optic network via said modified optical test access switch and said wavelength division multiplexor module.

* * * * *